Oct. 17, 1944.     E. C. BIXEL     2,360,643
TOW HOOK MOUNTING FOR VEHICLES
Filed June 30, 1943
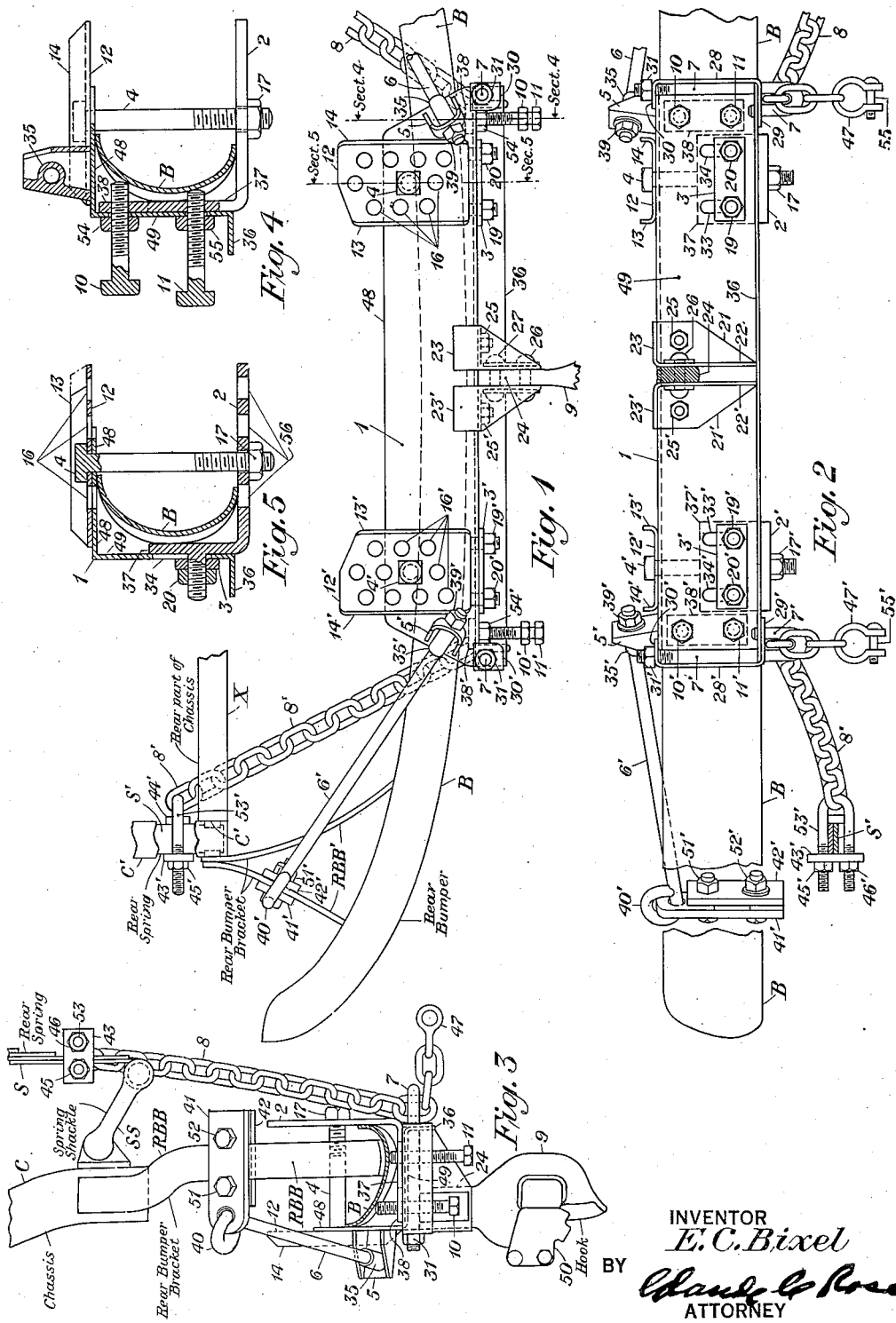
INVENTOR
*E. C. Bixel*
BY
*Edward C. Rose*
ATTORNEY Patented Oct. 17, 1944

2,360,643

UNITED STATES PATENT OFFICE 2,360,643

TOW HOOK MOUNTING FOR VEHICLES

Edward Carl Bixel, West Orange, N. J., assignor to American Telephone and Telegraph Company, a corporation of New York Application June 30, 1943, Serial No. 492,885

7 Claims. (Cl. 280—33.44)

This invention relates to a mounting for a tow hook by means of which the tow hook may be attached to an automotive device for towing trailers.

In the operation of automotive devices, such as passenger and light commercial cars, cases frequently arise where it becomes necessary to use such cars for towing emergency or work trailers. It is, therefore, desirable to have available a mounting for a tow hook which may be readily attached to the rear bumper of the car.

The rear bumpers of motor cars vary quite widely in both dimensions and design. To design a special tow hook attachment for each type and size of bumper now in use would be quite impractical. It is, therefore, an object of the invention to provide a mounting for a tow hook which may be readily attached to substantially any type of rear bumper for a car. A further object of the invention is to provide a mounting which not only meets the foregoing requirements but will be rugged and capable of being firmly attached to the bumper without serious danger of breakage or dislocation.

The invention will now be more fully understood from the following detailed description thereof when read in connection with the accompanying drawing. In the drawing Figure 1 is a plan view of the tow hook mounting shown attached to the bumper of a motor car. In this plan view the various elements and parts are portrayed as they would appear when looking down upon the apparatus from above. Fig. 2 is a view of the same equipment as seen when looking toward the rear of the car to which it is attached. Fig. 3 is a view of the apparatus as it appears when looking at it endwise. Figs. 4 and 5 are cross-sections taken along the dashed lines in Fig. 1 designated "section 4" and "section 5", respectively, and looking in the direction of the arrows.

In Figs. 1, 2 and 3 a rear bumper B of a car is shown broken away at one end to avoid duplication, the bumper being attached by means of rear bumper brackets [such as RBB and RBB'] to the side frame members C and C', respectively, of a chassis. See particularly Figs. 1 and 3. The side members C and C' of the chassis may be connected at the rear by cross member X, shown in Fig. 1.

The principal element of the tow hook mounting is a main plate 1 which, as will appear more particularly from Figs. 4 and 5, is Z-shaped. As shown in Figs. 4 and 5, the plate 1 comprises a vertical member 49 having an upper shelf or leg 48 adapted to lie over the top of the bumper B, and a lower shelf or leg 36. The upper shelf 48 extends in a direction toward the motor car to which the rear bumper is attached, whereas the lower shelf 36 extends in a direction to the rear and away from the motor car.

In the vertical member 49 of the main plate 1 pairs of vertical slots are cut, as shown in Fig. 2, the slots at the right-hand being designated 33 and 34, respectively, and at the left-hand being designated 33' and 34', respectively. By means of these slots L-shaped brackets 2 and 2' having vertical legs 37 and 37', respectively, may be adjustably attached to the vertical element 49 of the main plate 1. (See particularly Fig. 5.) For this purpose the vertical legs 37 and 37' of the two brackets are provided with studs which may be projected through the pairs of slots 33—34 and 33'—34', respectively.

Perforated holding plates, such as 3 and 3', are slipped over the ends of the studs, and the brackets are then clamped to the vertical member 49 of the plate 1 by means of nuts, such as 19 and 20 in the case of the bracket 2, and 19' and 20' in the case of the bracket 2'. Thus it will be seen that when the main plate 1 is positioned so its top shelf 48 overhangs the top of the bumper B, the brackets 2 and 2' may be positioned and clamped against the lower edge of said bumper B.

At either end of the main plate 1 of the mounting, channel-shaped plates or brackets 12 and 12' are attached just above the brackets 2 and 2' previously described. These plates or brackets 12 and 12' may be welded or otherwise fixedly attached to the upper shelf 48 of the main plate 1 so as to extend beyond the edge in a direction toward the body of the car. Plate 12 is provided with side flanges 13 and 14, and plate 12' with side flanges 13' and 14', as shown particularly in Figs. 1 and 2. These flanges serve to strengthen the plates and make them more rigid.

A series of variously positioned holes, designated 16 in the case of the plate 12, and 16' in the case of the plate 12', are drilled through the plates. Some of the holes also extend through the upper shelf of the main plate 1 where it overlaps plates 12 and 12', shown particularly in Figs. 1 and 5. A similar set of holes designated 56 (see Fig. 5) is drilled through the horizontal leg of the bracket 2 in alignment with the holes 16 as shown in Fig. 5. Similar holes are also provided in the horizontal member of the bracket 2' in alignment with the holes 16' of the plate or bracket 12'.

When the main plate 1 and the brackets 2 and 2' are clamped over the bumper B, as previously described, a square-headed holding pin 4 is inserted through the aligned pair of holes of the brackets 2 and 12 lying nearest the upper lip of the bumper B. A similar pin 4' is likewise inserted through a pair of aligned holes in the brackets 2' and 12', these pins serving to prevent the tow hook mounting from being dislodged from the bumper. Nuts, such as 17 and 17', upon the ends of the pins 4 and 4' serve to hold the pins in position and clamp the elements 2, 12, 2' and 12' of the mounting upon the upper and lower sides of the bumper B.

It will be evident, of course, that the use of pins, such as 4 and 4', to prevent the mounting from being dislodged from the bumper B will not rigidly secure it to the bumper. In order to accomplish this result, however, plates 38 and 38' are welded or otherwise secured to the vertical element 49 of the main plate 1, as shown in dotted lines in Figs. 1 and 2, and in full lines in Figs. 3 and 4. Through these plates set screws 10 and 11 in the case of the plate 38, and 10' and 11' in the case of the plate 38', are inserted. These may be adjusted against the face of the bumper B to take up the slack between the bumper and the pins 4 and 4' of the tow hook mounting as shown particularly in Figs. 3 and 4. When the said screws are properly adjusted, they may be held in their adjusted position by means of lock nuts, such as 54, 55, 54' and 55'. The mounting is then firmly fixed upon and attached to the rear bumper B.

Near the center part of the main plate 1 brackets 21 and 21' are attached by a welding or other means, such as the nuts 25 and 25' shown in Figs. 1 and 2. These brackets have flanges lying side by side, as shown in Fig. 2, and between the flanges the shank 24 of the tow hook 9 is riveted by means of rivets such as 26 and 27, as more clearly shown in Figs. 1 and 2. The tow hook 9 is of the usual construction and is provided with a detent or latch 50 of the usual type for holding an element of the trailer within the bight of the hook. The brackets 21 and 21' have upper flanges 23 and 23' which serve to hold rigid the angles of the brackets 21 and 21'. These flanges 23 and 23' overlie the upper shelf 12 of the main plate 1 and may be welded or otherwise secured thereto if desired. By means of this arrangement the tow hook 9 is fixedly secured to the mounting at the middle portion thereof, and when the mounting is attached to the bumper in the manner previously described, it should be so positioned that the tow hook will be centrally aligned with respect to the car.

Near either end of the upper shelf 48 of the main plate 1 brackets 5 and 5' are mounted. These brackets have hollow bosses, such as 35 and 35', respectively, through which tie bolts 6 and 6' may be extended for attachment to the rear bumper brackets such as RBB and RBB'. For this purpose the tie bolts 6 and 6' are passed through holes in plates 41 and 41', and the ends are then bent to form eyes 40 and 40' tying the tie bolts to said plates. Each of these plates is then clamped to companion plates 42 and 42', by means of nuts and bolts 51, 52 in the case of tie bolt 6, and 51', 52' in the case of tie bolt 6', with the rear bumper brackets in each case clamped between the plates. When thus fixed with respect to the rear bumper brackets RBB and RBB', the opposite ends of the tie bolts 6 and 6' which pass through the hollow bosses 35 and 35' of the brackets 5 and 5' are pulled up taut by means of nuts 39 and 39'. In this manner the tie bolts will aid in keeping the tow hook mounting centered and the towing forces will be transmitted as closely as possible to the chassis anchorage.

At either end of the main plate 1 U-shaped members 28 and 28' are attached. The lower legs 29 and 29' of the U-shaped members 28 and 28' may, if desired, be welded to the lower shelf 36 of the main plate 1, as shown in Fig. 2. The upper legs 30 and 30' of each U-shaped member overlap the edge of the upper shelf 48 of the main plate 1 near its junction with the vertical element 49 of the plate. If desired, the upper legs 30 and 30' may be welded or otherwise secured to the upper shelf 48 of main plate 1.

A J-shaped bolt 7, in the bight of which a link of a stay chain 8 is held, may be passed through suitable holes in the legs of the member 28 and the lower shelf 36 of main plate 1. A nut 31 is then drawn up to lock the link of the chain 8 in position, as shown particularly in Fig. 2. Similarly a J-shaped bolt 7' holding a link of chain 8' is passed through holes in the legs of member 28' and through a hole in the lower shelf 36 of the main plate 1, and is locked in position by means of a nut 31'. To the end links of chains 8 and 8', U-shaped bolts such as 53 and 53' (see Figs. 1, 2 and 3) are attached. The legs of the U-shaped bolt 53' are straddled over the spring S' and passed through suitable clamping plates 43' and 44'. The U-shaped bolt 53' is then clamped to the spring S' by drawing up nuts 45' and 46', shown particularly in Figs. 1 and 2. Similarly the U-shaped bolt 53 is clamped over the spring S, as shown in Fig. 3. The springs are, of course, attached by means of the usual spring shackles such as SS in Fig. 3 to the frame of the chassis.

The tie chains, when attached as above described, operate as a safety feature to prevent the tow hook mounting and the attached trailer from being disengaged and lost in case the clamping bolts or other parts should be jarred loose in traveling. The tie chains 8 and 8' are thus important from the safety standpoint. They also serve an additional purpose where the state laws require drag chains to extend from the towing car to the trailer as a safety feature in case the coupling should break or otherwise release the trailer. Such drag chains may be attached to the end links of the safety chains 8 and 8' by means of the clevises 47 and 47' with their pins 55 and 55', respectively.

While this invention has been disclosed in certain specific arrangements which are deemed desirable, it will be obvious that the general principles herein set forth may be embodied in many other organizations, widely different from those illustrated, without departing from the spirit of the invention as defined in the appended claims.

What is claimed is:

1. A tow hook mounting for the rear bumper of an automotive vehicle, said mounting including a main plate to which a tow hook is fixed, said plate having a vertical member of substantial length as compared with the bumper and adapted to lie behind the rear bumper of a vehicle along a substantial portion thereof, said plate having a shelf adapted to overlie the bumper, L-shaped brackets near each end of said plate and each having one leg arranged to be adjustably clamped to the vertical member of said main plate so that the other leg of the bracket will lie under bumpers of various sizes and embrace the same, and adjustable means to hold the main plate and L-shaped bracket in place on the bumper and prevent disengagement therefrom, whereby the tow hook may be used to tow a trailer.

2. A tow hook mounting for the rear bumper of an automotive vehicle, said mounting including a main plate to which a tow hook is fixed, said plate having a vertical member of substantial length as compared with the bumper and adapted to lie behind the rear bumper of a vehicle along a substantial portion thereof, said plate having a shelf adapted to overlie the bumper, L-shaped brackets near each end of said plate and each having one leg arranged to be adjustably clamped to the vertical member of said main plate so that the other leg of the bracket will lie under bumpers of various sizes and embrace the same, adjustable means to hold the main plate and L-shaped bracket in place on the bumper and prevent disengagement therefrom, whereby the tow hook may be used to tow a trailer, and adjustable tie bolts attached to the ends of said main plate and secured to an element fixed to the chassis of the vehicle.

3. A tow hook mounting for the rear bumper of an automotive vehicle, said mounting including a main plate to which a tow hook is fixed, said plate having a vertical member of substantial length as compared with the bumper and adapted to lie behind the rear bumper of a vehicle along a substantial portion thereof, said plate having a shelf adapted to overlie the bumper, L-shaped brackets near each end of said plate and each having one leg arranged to be adjustably clamped to the vertical member of said main plate so that the other leg of the bracket will lie under bumpers of various sizes and embrace the same, adjustable means to hold the main plate and L-shaped bracket in place on the bumper and prevent disengagement therefrom, whereby the tow hook may be used to tow a trailer, adjustable tie bolts attached to the ends of said main plate and secured to an element fixed to the chassis of the vehicle, and tie chains each having one end adjustably coupled to an end of said main plate and having its other end secured to an element fixed to the chassis of the vehicle.

4. A tow hook mounting for the rear bumper of an automotive vehicle, said mounting including a main plate to which a tow hook is fixed, said plate having a vertical member adapted to lie behind the rear bumper of a vehicle and having a shelf adapted to overlie the bumper, an L-shaped bracket having one leg arranged to be adjustably clamped to the vertical member of said main plate so that the other leg of the bracket will lie under bumpers of various sizes and embrace the same, an extension of the shelf of said main plate extending toward the vehicle, said shelf and extension having a series of holes therethrough at different distances from the vertical member of said main plate, the underlying leg of said L-shaped bracket having corresponding holes, and a holding pin adapted to be passed through the one of said first mentioned holes nearest the back side of said bumper and the corresponding hole in said underlying leg of said L-shaped bracket to hold the main plate and L-shaped bracket in place on the bumper and prevent disengagement therefrom, whereby the tow hook may be used to tow a trailer.

5. A tow hook mounting for the rear bumper of an automotive vehicle, said mounting including a main plate to which a tow hook is fixed, said plate having a vertical member adapted to lie behind the rear bumper of a vehicle and having a shelf adapted to overlie the bumper, an L-shaped bracket having one leg arranged to be adjustably clamped to the vertical member of said main plate so that the other leg of the bracket will lie under bumpers of various sizes and embrace the same, an extension of the shelf of said main plate extending toward the vehicle, said shelf and extension having a series of holes therethrough at different distances from the vertical member of said main plate, the underlying leg of said L-shaped bracket having corresponding holes, a holding pin adapted to be passed through the one of said first mentioned holes nearest the back side of said bumper and the corresponding hole in said underlying leg of said L-shaped bracket, and set screws passing through the vertical member of said main plate and adapted to be adjusted against the face of the bumper to maintain the back side thereof rigidly against said holding pin to hold the main plate and L-shaped bracket in place on the bumper and prevent disengagement therefrom, whereby the tow hook may be used to tow a trailer.

6. A tow hook mounting for the rear bumper of an automotive vehicle, said mounting including a main plate to which a tow hook is fixed, said plate having a vertical member adapted to lie behind the rear bumper of a vehicle and having a shelf adapted to overlie the bumper, an L-shaped bracket having one leg arranged to be adjustably clamped to the vertical member of said main plate so that the other leg of the bracket will lie under bumpers of various sizes and embrace the same, an extension of the shelf of said main plate extending toward the vehicle, said shelf and extension having a series of holes therethrough at different distances from the vertical member of said main plate, the underlying leg of said L-shaped bracket having corresponding holes, a holding pin adapted to be passed through the one of said first mentioned holes nearest the back side of said bumper and the corresponding hole in said underlying leg of said L-shaped bracket, set screws passing through the vertical member of said main plate and adapted to be adjusted against the face of the bumper to maintain the back side thereof rigidly against said holding pin to hold the main plate and L-shaped bracket in place on the bumper and prevent disengagement therefrom, whereby the tow hook may be used to tow a trailer, and adjustable tie bolts attached to the ends of said main plate and secured to an element fixed to the chassis of the vehicle.

7. A tow hook mounting for the rear bumper of an automotive vehicle, said mounting including a main plate to which a tow hook is fixed, said plate having a vertical member adapted to lie behind the rear bumper of a vehicle and having a shelf adapted to overlie the bumper, an L-shaped bracket having one leg arranged to be adjustably clamped to the vertical member of said main plate so that the other leg of the bracket will lie under bumpers of various sizes and embrace the same, an extension of the shelf of said main plate extending toward the vehicle, said shelf and extension having a series of holes therethrough at different distances from the vertical member of said main plate, the underlying leg of said L-shaped bracket having corresponding holes, a holding pin adapted to be passed through the one of said first mentioned holes nearest the back side of said bumper and the corresponding hole in said underlying leg of said L-shaped bracket, set screws passing through the vertical member of said main plate and adapted to be adjusted against the face of the bumper to maintain the back side thereof rigidly against said holding pin to hold the main plate and L-shaped bracket in place on the bumper and prevent disengagement therefrom, whereby the tow hook may be used to tow a trailer, adjustable tie bolts attached to the ends of said main plate and secured to an element fixed to the chassis of the vehicle, and tie chains each having one end adjustably coupled to an end of said main plate and having its other end secured to an element fixed to the chassis of the vehicle.

EDWARD C. BIXEL.